United States Patent
Shreve

(10) Patent No.: US 8,850,971 B1
(45) Date of Patent: Oct. 7, 2014

(54) REINFORCED PRESS BASE, STRENGTHENING RING, AND METHOD OF REINFORCING A PRESS BASE

(75) Inventor: Shelby M. Shreve, Springville, UT (US)

(73) Assignee: US Synthetic Corporation, Orem, UT (US)

(*) Notice: Subject to any disclaimer, the term of this patent is extended or adjusted under 35 U.S.C. 154(b) by 817 days.

(21) Appl. No.: 12/916,097

(22) Filed: Oct. 29, 2010

Related U.S. Application Data

(60) Provisional application No. 61/256,209, filed on Oct. 29, 2009, provisional application No. 61/256,219, filed on Oct. 29, 2009, provisional application No. 61/256,248, filed on Oct. 29, 2009, provisional application No. 61/256,267, filed on Oct. 29, 2009.

(51) Int. Cl.
*B30B 15/06* (2006.01)

(52) U.S. Cl.
USPC .......................................... 100/295; 100/214

(58) Field of Classification Search
USPC .......... 100/214, 232, 269.01, 269.18, 269.21, 100/295; 425/77, 78, 193, 330, 405.2, 425/DIG. 26; 419/48, 51
See application file for complete search history.

(56) References Cited

U.S. PATENT DOCUMENTS

| | | | |
|---|---|---|---|
| 2,389,818 A | 11/1945 | Rode et al. | |
| 2,790,204 A | 4/1957 | Edwards et al. | |
| 2,918,699 A | 12/1959 | Hall | |
| 2,941,248 A | 6/1960 | Hall | |
| 2,968,837 A | 1/1961 | Zeitlin et al. | |
| 3,093,862 A | 6/1963 | Gerard et al. | |
| 3,093,863 A | 6/1963 | Ehlert | |
| 3,159,876 A | 12/1964 | Hall | |
| 3,160,089 A | 12/1964 | Platou | |
| 3,182,353 A | 5/1965 | Hall | |
| 3,255,490 A | 6/1966 | Sturm | |
| 3,257,688 A | 6/1966 | Levey, Jr. | |
| 3,440,687 A | 4/1969 | Hall | |
| 3,783,774 A * | 1/1974 | Groos et al. | 100/214 |
| 3,914,078 A | 10/1975 | Kendall | |
| 3,922,127 A * | 11/1975 | Schwarzkopf | 425/78 |
| 4,302,168 A | 11/1981 | Khvostantsev | |
| 4,927,345 A | 5/1990 | Takei et al. | |
| 5,364,253 A * | 11/1994 | Kojima et al. | 425/78 |
| 5,744,170 A | 4/1998 | Hall | |
| 5,780,139 A | 7/1998 | Carter et al. | |
| 5,851,568 A | 12/1998 | Huang | |

(Continued)

FOREIGN PATENT DOCUMENTS

CN 2291198 Y 9/1998

*Primary Examiner* — Jimmy T Nguyen
(74) *Attorney, Agent, or Firm* — Holland & Hart LLP

(57) ABSTRACT

Embodiments of the present invention include a press base assembly, a strengthening ring for use with press bases and related methods. In one embodiment, a press base assembly includes a press base having a body that includes a piston cavity at one end. The body, at a second end opposite that of the piston cavity, may exhibit a desired geometry. A strengthening ring may be shaped, sized and configured to substantially mate with the geometry of the second end of the body and be placed thereover. For example, the geometry of the second end may be substantially circular exhibiting a particular diameter and circumference. The strengthening ring may have substantially circular internal surface sized and configured such that the strengthening ring is positioned on the second end of the body in a manner that results in an interference fit between the two components.

13 Claims, 3 Drawing Sheets

(56) References Cited

U.S. PATENT DOCUMENTS

| | | |
|---|---|---|
| 6,022,206 A | 2/2000 | McNutt |
| 6,186,763 B1 | 2/2001 | Scanlan |
| 6,336,801 B1 | 1/2002 | Fish et al. |
| 6,336,802 B1 | 1/2002 | Hall |
| 7,186,104 B2 | 3/2007 | Hall et al. |
| 7,231,766 B2 | 6/2007 | Hall et al. |
| 7,354,262 B2 | 4/2008 | Hall et al. |
| 7,467,936 B2 | 12/2008 | Hall et al. |
| 7,467,937 B1 | 12/2008 | Hall et al. |
| 7,481,639 B2 | 1/2009 | Hall et al. |
| 7,497,675 B2 | 3/2009 | Hall et al. |
| 7,513,764 B1 | 4/2009 | Hall et al. |
| 7,517,203 B1 | 4/2009 | Hall et al. |
| 7,540,075 B2 | 6/2009 | Sung |
| 7,540,732 B1 | 6/2009 | Hall et al. |
| 7,569,249 B2 | 8/2009 | Hall et al. |
| 7,607,876 B2 | 10/2009 | Hall et al. |
| 7,819,648 B2 | 10/2010 | Yang et al. |

\* cited by examiner

REINFORCED PRESS BASE, STRENGTHENING RING, AND METHOD OF REINFORCING A PRESS BASE

CROSS-REFERENCE TO RELATED APPLICATIONS

The present application claims the benefit of each of U.S. Provisional Patent Application No. 61/256,209 filed Oct. 29, 2009, U.S. Provisional Patent Application No. 61/256,219 filed Oct. 29, 2009, U.S. Provisional Patent Application No. 61/256,248 filed Oct. 29, 2009 and U.S. Provisional Patent Application No. 61/256,267 filed Oct. 29, 2009, the disclosures of each which are incorporated by reference herein in their entireties.

BACKGROUND

High pressure presses have been used for decades in the manufacture of synthetic diamond. Such presses are capable of exerting a high pressure and high temperature on a volume of carbonaceous material to create conditions for sintering polycrystalline diamond. Known designs for high pressure presses include, but are not limited to, belt press type designs, tetrahedral press type designs, and cubic press type designs.

FIG. 1 shows a basic design for a conventional cubic press 10 known in the art. The design generally includes six press bases 12, with each press base 12 facing towards a common central region 14. Each press base 12 includes a piston cavity 13 (shown in dashed lines) that houses a piston 16. The cubic press 10 also comprises a series of tie bars 18 that extend between adjacent press bases 12 to add stability to cubic press 10.

During operation of cubic press 10, a piston 16 is thrust out of a piston cavity 13 in each press base 12 towards common central region 14. As pistons 16 move forward towards common central region 14, pistons 16 apply pressure to each side of a cubic volume of carbonaceous material located generally at an around common central region 14.

Various components of cubic press 10 are put under stress as a result of counter forces created in response to pressure being applied to the cubic volume of carbonaceous material located generally at common central region 14. For example, press bases 12 are subjected to forces during cubic press 10 operation that can lead to deformation of press bases 12. Such deformation, in turn, results in high stress fields in various components including the lower part of piston cavities 13. Over time and after numerous cycles, cracks may begin to form in the lower part of piston cavities 13, eventually shortening the fatigue life of press bases 12 and cubic press 10.

It would be advantageous to provide an improved press base of a high pressure press and a method of improving a press base of a high pressure press.

SUMMARY

The present disclosure relates to improvements in components of high pressure presses. In accordance with one embodiment of the present disclosure, a strengthening ring positioned around an outer circumferential surface of a press base of a high pressure press is described. In accordance with another embodiment, a press base assembly for a high pressure press having increased strength is described. In accordance with yet another embodiment of the present disclosure, a method of strengthening a press base of a high pressure press is described.

As already noted, one embodiment of the instant disclosure relates to a press base strengthening ring. The press base strengthening ring may comprise a generally annular shape. The press base strengthening ring may, for instance, comprise a first annular surface, a second annular surface, an inner diameter wall, and an outer diameter wall opposite the inner diameter wall. Both the inner diameter wall and outer diameter wall may be perpendicular to the first annular surface and second annular surface. The press base strengthening ring may also be "pre-stressed" or pre-loaded (i.e., while the press base assembly is in a relaxed, non-operative state) so as to exhibit a desired stress state when installed on an associated press base.

Another embodiment of the instant disclosure relates to a press base assembly. The press base assembly may comprise a press base and a press base strengthening ring. The press base may comprise a first end, having an outer diameter and an outer circumference, and a second end opposite the first end. The strengthening ring may comprise an inner diameter approximately equal to the outer diameter of the press base. The strengthening ring may be positioned around the first circumference of the press base. In one embodiment, an interference fit may be effected between the strengthening ring and the press base. The press base may also comprise a piston cavity and one or more tie rod receiving holes.

Still another embodiment of the instant disclosure relates to a method for strengthening a press base of a high pressure press. The method may include providing a press base having a first outer diameter and a first outer circumference. The method may also include providing a strengthening ring having an inner diameter approximately equal to the first outer diameter of the press base. The strengthening ring may be positioned about the first outer circumference of the press base.

Features from any of the above mentioned embodiments may be used in combination with one another, without limitation. In addition, other features and advantages of the instant disclosure will become apparent to those of ordinary skill in the art through consideration of the ensuing description, the accompanying drawings, and the appended claims.

Figure 1:
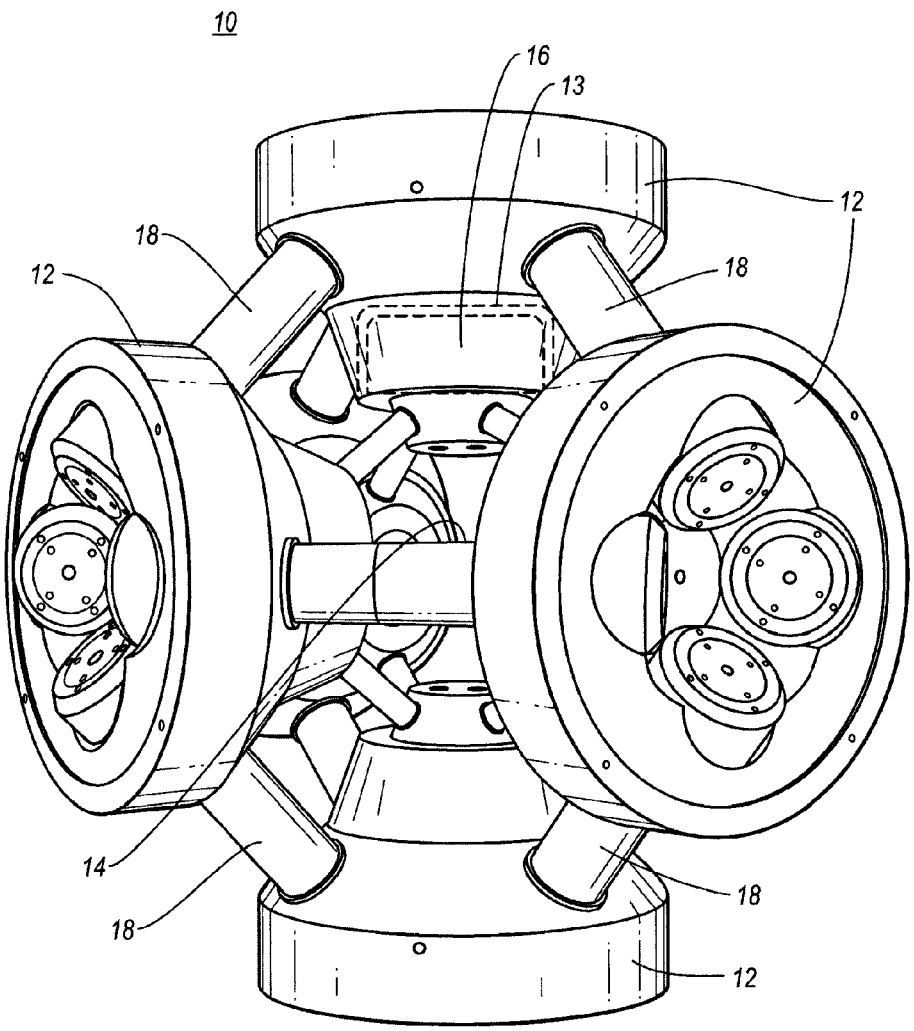
FIG. 1 is a perspective view of a conventional cubic press known in the art.

Throughout the drawings, identical reference characters and descriptions indicate similar, but not necessarily identical, elements. While the embodiments described herein are susceptible to various modifications and alternative forms, specific embodiments have been shown by way of example in the drawings and will be described in detail herein. However, the embodiments described herein are not intended to be limited to the particular forms disclosed. Rather, the instant disclosure covers all modifications, equivalents, and alternatives falling within the scope of the appended claims.

DETAILED DESCRIPTION

The instant disclosure relates generally to high pressure presses, improved components for high pressure presses and related methods. For purposes of explaining the features of the embodiments described herein, a cubic high pressure press will be described and illustrated. However, the embodiments and features described herein are not limited to use in or with a cubic press configuration. For example, the features disclosed herein could also be used in a tetrahedral press.

Figure 2:
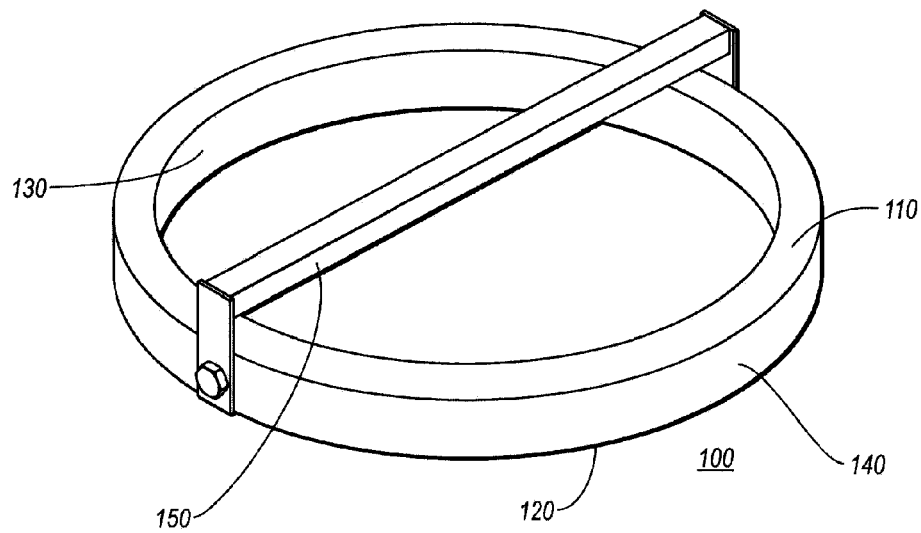
FIG. 2 is a perspective view of press base strengthening ring according to an embodiment of the instant disclosure.

FIG. 2 shows a press base strengthening ring 100 according to one embodiment disclosed herein. Press base strengthening ring 100 may generally include a first annular surface 110 and a second annular surface 120 opposite first annular surface 110. As shown in FIG. 2, first annular surface 110 may be parallel to second annular surface 120. However, first annular surface 110 need not be parallel to second annular surface 120 and other orientations may be used. As also shown in FIG. 2, first annular surface 110 may have a width (i.e., as measured from the outer radial periphery to the inner radial periphery) approximately equal to the width of second annular surface 120, although first annular surface 110 and second annular surface need not have the same width.

Press base strengthening ring 100 may also include an inner diameter wall 130 and an outer diameter wall 140 that is opposite inner diameter wall 130. As shown in FIG. 2, inner diameter wall 130 may be parallel to outer diameter wall 140. However, inner diameter wall 130 need not be parallel to outer diameter wall 140. As also shown in FIG. 2, inner diameter wall 130 may have a height (i.e., as measured from first annular surface 110 to the second annular surface 120) that is approximately equal to the height of outer diameter wall 140. However, in other embodiments, the height of inner diameter wall 130 and outer diameter wall need not be the same.

FIG. 2 further illustrates that inner diameter wall 130 and outer diameter wall 140 may be aligned perpendicular to first annular surface 110 and second annular surface 120. However, neither inner diameter wall 130 nor outer diameter wall 140 need be aligned perpendicular to first annular surface 110 and second annular surface 120, and in fact, non-perpendicular arrangements of some surfaces will result when, for example, the width of first annular surface 110 and the width of second annular surface 120 are not equal or when the height of inner diameter wall 130 and the height of outer diameter wall 140 are not equal. Further, in some embodiments, inner diameter wall 130 and/or outer diameter wall 140 wall may be non-cylindrical.

The material of press base strengthening ring 100 may include high strength materials, but is not limited to specific materials. In one embodiment, press base strengthening ring 100 may comprise, for example, steel or some other metal or metal alloy. In other embodiments, a composite material or any other high strength material may be used. Press base strengthening ring 100 may also comprise the same material as the press base with which press base strengthening ring 100 will be used. In one embodiment, press base strengthening ring 100 may also be configured to be pre-stressed or to apply a load to the press base while the press base assembly is in a non-load applying state so as to provide added strength to an associated press base.

Still referring to FIG. 2, press base strengthening ring 100 may also include a support bar 150. Support bar 150 may be used, for example, during installation of press base strengthening ring 100 on a press base. For example, a hook at an end of a chain or cable controlled by a crane or other overhead lift may be secured to support bar 150 to hoist press base strengthening ring 100 and transport it to a press base on which it is to be installed. Support bar 150 may extend across the diameter of press base strengthening ring 100 and may be secured at both ends, for example, to outer diameter surface 140 of press base strengthening ring 100. However, the location where support bar 150 attaches to press base strengthening ring 100 is not limited. For example, support bar 150 may attach to first annular surface 110 of press base strengthening ring. Additionally, the manner in which support bar 150 is secured to press base strengthening ring 100 is not limited. For example, support bar 150 may be welded to press base strengthening ring 100 or may be secured with screws or bolts (such as shown in FIG. 2).

As shown in FIG. 2, press base strengthening ring 100 may be a unitary element. That is to say, press base strengthening ring 100 may be constructed as a single piece of material. In other embodiments, press base strengthening ring 100 may be comprised of two or more pieces, such as two semi-circular portions connected together to form a ring or the use of multiple concentric rings disposed within one another. In one such example, two concentric rings may be used (e.g., with an inner ring press fit into an outer ring causing the inner ring to be in a pre-stressed compressive state or, in other words, to apply a force to the press base prior to operation of the press base assembly). In other embodiments, such as with composites, the strengthening ring 100 may include one or more elongated tensile members, such as carbon fibers, providing a desired hoop strength within the strengthening ring. Such a configuration may also include, for example, a plurality of wire hoops wound about the circumference of the press base.

Press base strengthening ring 100 may have an inner diameter that is approximately equal to an outer diameter of the press base with which press base strengthening ring 100 will be used. In so doing, press base strengthening ring 100 may be secured to a press base by an interference fit between the two pieces.

Application of press base strengthening ring 100 to a press base may generally comprise passing press base strengthening ring 100 over an outer end of the press base such that press base strengthening ring 100 surrounds an end of the press base. In one embodiment, the inner diameter of press base strengthening ring 100 may be sized, relative to the outer diameter of the end of the press base, such that press bar strengthening ring 100 is secured to the press base by an interference fit.

During operation of the cubic press, the thickness, material and fit of press bar strengthening ring 100 about the press base provides additional strength and support to the press base to thereby assist the press base in resisting the operational stress that tends to deform unsupported press bases. Where press bases are allowed to deform, the result may include high stress fields. Continued stress may lead to fatigue cracking, crack propagation and eventual failure of the component. Press base strengthening ring 100 provides support and resistance to deformation so as to help prevent fatigue cracking and slow fatigue crack propagation in the press bases.

It is also noted that press bases with existing cracks may be fitted with a strengthening ring 100. While a crack may have already been initiated in the press base, the subsequent use of the strengthening ring may be used to slow crack propagation and extend the useful life of the press base.

Figure 3:
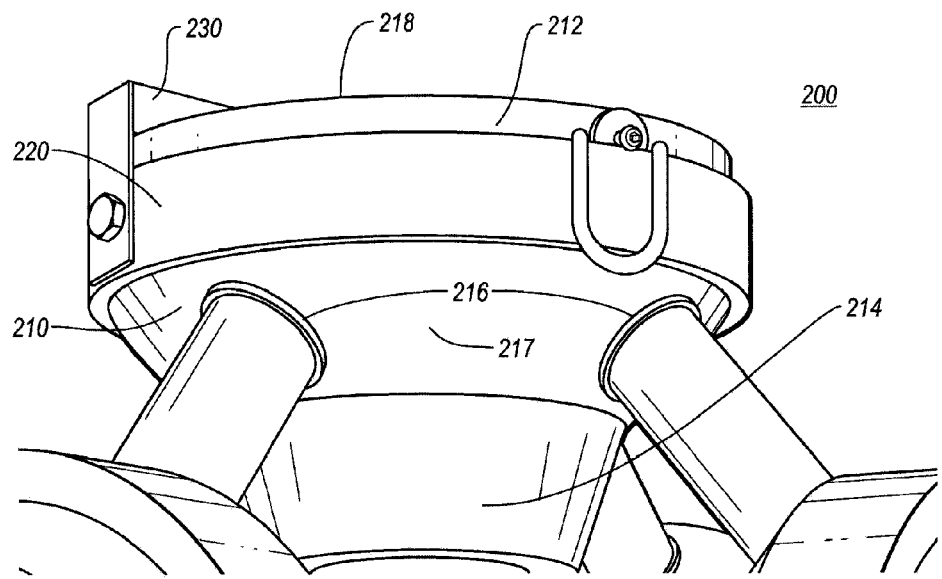
FIG. 3 is a perspective view of a press base assembly according to an embodiment of the instant disclosure.

Another embodiment of the present invention relates to a press base assembly 200. As shown in FIG. 3, press base assembly 200 may include a press base 210 and a strengthening ring 220 positioned around press base 210.

Press base 210 may include a first end 212 and a second end 214 opposite first end 212. First end 212 may generally be considered the outer end of press base 200 since it is the end opposite of where a piston is thrust out of press base 210. First end 212 of press base may include surface exhibiting a first outer diameter and associated circumference. In one embodiment, press base 210 may be configured generally cylindrically such that it exhibits a generally constant outer diameter and outer circumference from first end 212 to second end 214. In another embodiment, the outer diameter and outer circumference may vary along the length of press base 210 such as shown in FIG. 3 wherein a portion of press base 210 exhibits a substantially conical or frustoconical surface geometry.

Press base 210 may also comprise one or more tie rod receiving holes 216. Tie rod receiving holes 216 may be located, generally, between first end 212 and second end 214 of press base 210 and may extend from a first outer surface 217 of press base 210 to a top surface 218 (based on the orientation shown in FIG. 3) of press base 210. Tie rod receiving holes 216 may receive ends of tie rods positioned between adjacent press bases 210. Tie rods may be positioned in this manner to provide added stability to the cubic press. Strengthening ring 220 may be positioned on press base 200 between first end 212 and tie rod receiving holes 216 such that stress applied to first end 212 of press base 210 via tie rods received in tie rod receiving holes 216 is counteracted by strengthening ring 220.

Strengthening ring 220 may be similar, or even identical, to the press base strengthening ring described in the previous embodiment (i.e., strengthening ring 100). Accordingly, strengthening ring 220 may have a first annular face, a second annular face opposite the first annular face, an inner diameter wall, and an outer diameter wall opposite the inner diameter wall as described in greater detail above. As shown in FIG. 3, the inner and outer diameter walls may be substantially perpendicular to first and second annular faces, although other configurations may be employed. Stress ring 220 may also comprise an inner diameter that is approximately equal to the first outer diameter of first end 212 of press base 210. As shown in FIG. 3, strengthening ring 220 may be positioned around the first circumference of first end 212 of press base 210.

Also, as previously noted, the material of strengthening ring 220 may be formed, at least in part, from a metal, a metal alloy, a composite or any other high strength material, but is not limited to any specific material. Strengthening ring 220 may also be pre-stressed to provide additional strength and support when installed on the press base 210.

Once positioned on press base 210, strengthening ring 220 may be secured to press base 210. Any manner of securing strengthening ring 220 to press base 210 may be used. For example, strengthening ring 220 may be secured to press base 210 by an interference fit between strengthening ring 220 and press base 210. Strengthening ring 220 may have an inner diameter approximately equal to (but slightly smaller than) the first outer diameter at first end 212 of press base 210 to provide an interference fit between the two components.

Strengthening ring 220 may also include a support bar 230. Support bar 230 may extend across the diameter of strengthening ring 220 and may be used to transport and install strengthening ring 220 on press base 210 as described in greater detail above.

Strengthening ring 220 may also be a unitary element. In other embodiments, strengthening ring 220 may be formed of two or more pieces, such as two semi-circular portions connected together to form a ring or multiple concentric rings.

Figure 4:
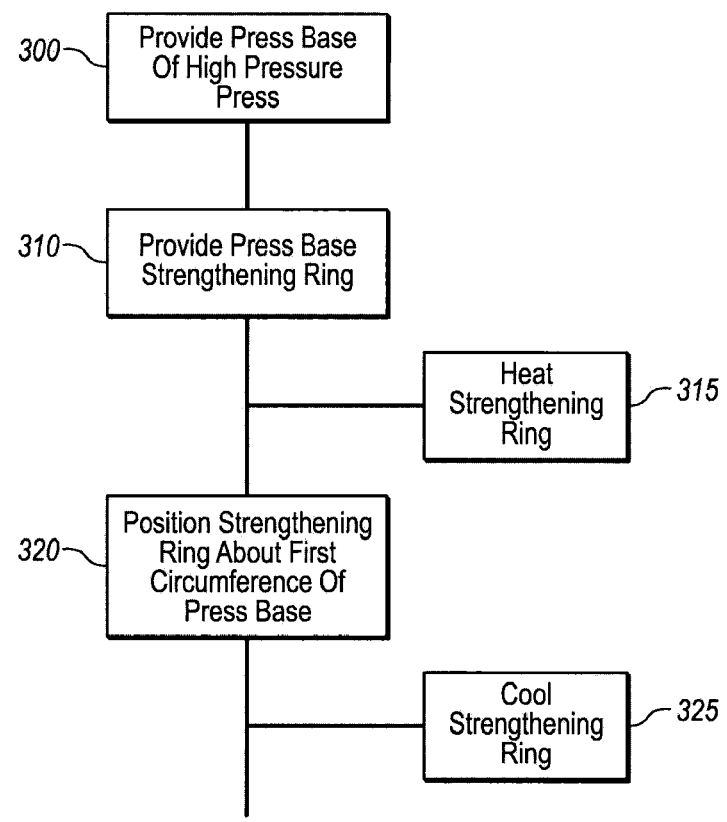
FIG. 4 is a flow chart detailing a method of strengthening a press base according to an embodiment of the instant disclosure.

Referring now to FIG. 4, a method of strengthening a press base of a high pressure press is disclosed in accordance with another embodiment of the present invention. The method may be used to help strengthen a press base of a high pressure press so that the press base is less susceptible to deformation and mechanical failure.

As indicated at 300, the method may include providing a press base of a high pressure press. The press base may be, for example, similar to the press bases described hereinabove. Accordingly, the press base may comprise a first outer diameter and a first outer circumference. The first outer diameter and first outer circumference may be located at a first end of the press base. The first end of the press base may be opposite the end having a piston cavity for receiving a piston. The press base may also include other features such as, for example, one or more tie bar receiving holes. Tie bar receiving holes may be sized and configured to receive tie bars extending between adjacent press bases and which are configured to provide increased stability and strength to the high pressure press.

As indicated at 310 of the presently considered method, a strengthening ring may be provided. The strengthening ring may have an inner diameter that is approximately equal to the first outer diameter of the press base. The strengthening ring may be similar to the press base strengthening ring described in the first embodiment disclosed herein. Accordingly, the strengthening ring may comprise a first annular surface, a second annular surface opposite the first annular surface, an inner diameter wall, and an outer diameter wall opposite the inner diameter wall. The inner diameter and outer diameter walls may be aligned substantially perpendicular to the first and second annular surfaces.

The strengthening ring may be made from any suitable material such as has been discussed above. The strengthening ring may also be pre-stressed to provide additional strength and support.

As shown at 320, the strengthening ring may be positioned about the first circumference of the press base. Positioning the strengthening ring about the first circumference of the press base may be accomplished by, for example, passing the strengthening ring over the first end of the press base.

The method disclosed herein may also comprise securing the strengthening ring to the press base. Any suitable manner of securing the strengthening ring to the press base may be used. For example, an interference fit between the strengthening ring and the press base may be used to secure the strengthening ring to the press base. In other embodiments, a close fit between the strengthening ring and the press base may be employed with other securing techniques such as by use of fasteners, welding, adhesives, or other appropriate means.

Optionally, prior to positioning the strengthening ring about the first circumference of the press base, the method may include heating the strengthening ring, as indicated at 315, so as to enlarge the size of the strengthening ring through thermal expansion. Optionally, at least a portion of the press base may be cooled (e.g., with liquid nitrogen, or by any other method) so as to shrink the size of the end upon which the strengthening ring is to be positioned. Of course, heating the stress reducing ring and/or cooling at least a portion of the press base may be employed, without limitation.

In so doing, positioning the strengthening ring over the first end of the press base may be made easier by virtue of the inner diameter of the strengthening ring being slightly larger than the first outer diameter of the press base rather than approximately equal to the first outer diameter of the press base.

Following the heating and positioning of the strengthening ring, the method may also comprise cooling the strengthening ring once it is in place about the first outer circumference of the press base as indicated at 325. In so doing, the size of the strengthening ring may be reduced (due to thermal contraction) to thereby constrict the strengthening ring about the first outer circumference of the press base and effect a tight fit between the press base and the strengthening ring.

While certain embodiments have been shown to include a strengthening ring formed as a single continuous structure, such a ring may be formed of multiple components. For example, multiple semicircular components may be bolted together to form a strengthening ring. Such may be sized and configured so that tightening of the bolts or fasteners used to join the components together also serve to apply a pre-load to the press base when installed.

In another example embodiment that includes multiple components, a first ring may be placed around the press base where the first ring includes ramped surfaces. Additionally rings may be configured with respect to the ramped surfaces such that the additional rings may be clamped axially toward one another effecting application of a radial compressive load (via interaction with the ramped surfaces) on the first ring and, thus, the press base.

In yet another example embodiment that incorporates multiple components, a ring may be placed about the press base and then several turns of a continuous wire may be placed about the ring while the wire is in tension. Thus, the tensile wire may apply a load to the ring and the press base.

While certain embodiments and details have been included herein for purposes of illustrating aspects of the instant disclosure, it will be apparent to those skilled in the art that various changes in systems, apparatus, and methods disclosed herein may be made without departing from the scope of the instant disclosure, which is defined, in part, in the appended claims. The words "including" and "having," as used herein including the claims, shall have the same meaning as the word "comprising."

What is claimed is:

1. A press base assembly comprising:
   a press base comprising:
      a first end having a first outer diameter and first outer circumference;
      a second end opposite the first end;
      a piston cavity;
      at least one tie rod receiving hole located between the first end and second end; and
   a strengthening ring positioned around, and configured to maintain contact with, the first outer circumference of the press base.

2. The press base assembly of claim 1, wherein the strengthening ring is pre-stressed.

3. The press base assembly of claim 1, wherein the strengthening ring further comprises:
   a first annular surface;
   a second annular surface opposite the first annular surface;
   an inner diameter wall substantially perpendicular to each of the first annular surface and the second annular surface; and
   an outer diameter wall opposite the inner diameter wall and substantially perpendicular to each of the first annular surface and the second annular surface.

4. The press base assembly of claim 1, wherein the strengthening ring is secured to the press base.

5. The press base assembly of claim 4, wherein the strengthening ring is secured to the press base by an interference fit between the strengthening ring and the press base.

6. A press base assembly comprising:
   a press base comprising:
      a first end having a first outer diameter and first outer circumference;
      a second end opposite the first end;
   a strengthening ring positioned around the first outer circumference of the press base; and
   a support bar coupled with a first portion of the strengthening ring and a second portion of the strengthening ring.

7. The press base assembly of claim 1, wherein the strengthening ring comprises steel.

8. The press base assembly of claim 1, wherein the strengthening ring is formed as a single, continuous structure.

9. The press base assembly of claim 6, wherein the strengthening ring is pre-stressed.

10. The press base assembly of claim 6, wherein the strengthening ring further comprises:
    a first annular surface;
    a second annular surface opposite the first annular surface;
    an inner diameter wall substantially perpendicular to each of the first annular surface and the second annular surface; and
    an outer diameter wall opposite the inner diameter wall and substantially perpendicular to each of the first annular surface and the second annular surface.

11. The press base assembly of claim 6, wherein the strengthening ring is secured to the press base.

12. The press base assembly of claim 11, wherein the strengthening ring is secured to the press base by an interference fit between the strengthening ring and the press base.

13. The press base assembly of claim 6, wherein the strengthening ring comprises steel.

* * * * *